(12) United States Patent
Bettella

(10) Patent No.: US 6,662,888 B2
(45) Date of Patent: Dec. 16, 2003

(54) MOTOR-DRIVEN TRANSPORT TROLLEY WITH DIFFERENTIATED DRIVE

(76) Inventor: Massimo Bettella, Via delle Granze Sud 49/6, Camin-Padova 35020 (IT)

(*) Notice: Subject to any disclaimer, the term of this patent is extended or adjusted under 35 U.S.C. 154(b) by 0 days.

(21) Appl. No.: 09/773,630

(22) Filed: Feb. 2, 2001

(65) Prior Publication Data
US 2001/0015298 A1 Aug. 23, 2001

(30) Foreign Application Priority Data
Feb. 23, 2000 (IT) .................................. PD200000A048

(51) Int. Cl.⁷ .............................................. B62D 51/04
(52) U.S. Cl. ...................... 180/19.1; 180/6.48; 180/305
(58) Field of Search ........................ 180/6.2, 6.3, 6.48, 180/6.58, 305, 308, 19.1, 19.2, 19.3

(56) References Cited

U.S. PATENT DOCUMENTS

| | | | | |
|---|---|---|---|---|
| 3,828,875 A | * | 8/1974 | Tarter ......................... | 180/6.48 |
| 3,882,885 A | * | 5/1975 | McCain ...................... | 180/6.48 |
| 4,137,984 A | * | 2/1979 | Jennings et al. ........... | 180/19.1 |
| 4,620,603 A | * | 11/1986 | Reeves et al. ............. | 180/19.1 |
| 4,697,661 A | * | 10/1987 | Pajerski et al. ............ | 180/19.3 |
| 4,837,694 A | * | 6/1989 | Narita et al. ............... | 180/6.48 |
| 5,012,879 A | * | 5/1991 | Bianek et al. .............. | 180/6.48 |
| 5,158,150 A | * | 10/1992 | Askeland et al. ........... | 180/305 |
| 5,181,579 A | * | 1/1993 | Gilliem ...................... | 180/19.1 |
| 5,350,033 A | * | 9/1994 | Kraft .......................... | 180/6.58 |
| 5,584,354 A | * | 12/1996 | Tugnoli ...................... | 180/19.1 |
| 5,809,755 A | * | 9/1998 | Velke et al. ................ | 180/6.48 |
| 5,842,532 A | * | 12/1998 | Fox et al. ................... | 180/6.48 |
| 5,964,082 A | * | 10/1999 | Wright et al. .............. | 180/6.48 |
| 6,076,621 A | * | 6/2000 | Horn .......................... | 180/19.2 |

FOREIGN PATENT DOCUMENTS

EP          0 479 735 A1 *  4/1992  ................. 180/65.1

* cited by examiner

Primary Examiner—Frank Vanaman
(74) Attorney, Agent, or Firm—Dowell & Dowell P.C.; Ralph A. Dowell

(57) ABSTRACT

A low profile motor-driven transport trolley including a frame upon which a rotating plate may be mounted. The frame is supported by sets of wheels disposed on opposite sides thereof and hydraulic motors are provided to power the sets of wheels separately to obtain a differentiated drive. The motors are hydraulic and are fed by a pump to thereby control motion of the sets of wheels.

4 Claims, 2 Drawing Sheets

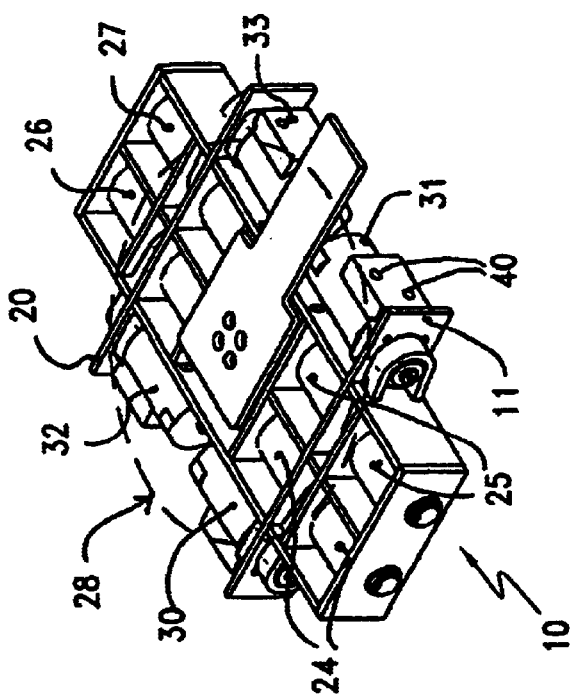
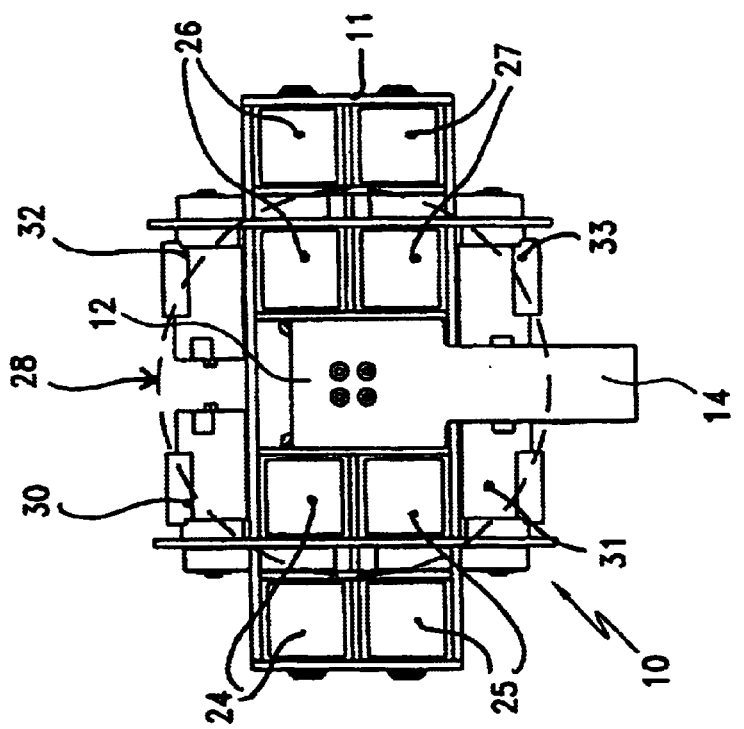

MOTOR-DRIVEN TRANSPORT TROLLEY WITH DIFFERENTIATED DRIVE

BACKGROUND OF THE INVENTION

1. Field of the Invention

This patent concerns the sector of porterage equipment and particularly it concerns trolleys for shifting bulky and heavy objects. This patent specifically refers to a new motor-driven transport trolley with differentiated drive on both sides.

2. Description of the Related Art

Transport trolleys are already known for voluminous and/or heavy objects. These trolleys comprise two or more groups of broad wheels with small diameter. One of these trolleys is equipped with a rotating horizontal upper platform, on which the object to be transported rests, and a bar for towing and guiding the trolley, while trolleys without a rotating platform are placed at the rear.

The trolleys composed as described above are towed by hand by a number of persons.

Some trolleys are equipped with an electric motor which transmits motion to all the wheels of the trolley, in such a way as to make it less tiring to tow the object that is to be transported. Though convenient, these motor-driven trolleys still present certain drawbacks, including the need for powerful motors to start towing the transported object (pickup) and the difficulty of going round bends since, as the motor acts simultaneously on all the wheels, it is not easy to turn the trolley.

SUMMARY OF THE INVENTION

To overcome all the above problems, a new type of transport trolley has been designed and implemented, equipped with hydraulic motors which act independently on two or more wheels or groups of wheels placed on the two sides. As regards its main parts, the new transport trolley comprises a frame or bearing structure, two wheels or sets of wheels, one or more pairs of hydraulic motors, a rotating horizontal upper platform and a control unit for the various motors.

The frame or bearing structure connects and joins the various other parts. In particular it has a generally flat shape and the rotating horizontal platform is placed on top. This platform can turn with vertical axis in such a way as to allow the changing of the direction of the trolley with respect to the object transported.

On each of the two sides of the frame or structure is placed a set of wheels with small diameter and broad width. Each of the two wheels or sets of wheels receives motion, independently of the other, from one or more hydraulic motors. In other words, two or more hydraulic motors serve and move the wheels of a right-hand set and of a left-hand set.

The connection between the hydraulic motor or motors and the corresponding set of wheels may be achieved by means of cogged belts, chains with links or gears so that all the wheels in a set receive exactly the same motion at the same time.

The control unit oversees and controls the operation of the various motors and is equipped with a push-button panel or a control stick for controlling the movement of the trolley in the various directions. This push-button panel or control stick may be connected to the control unit by means of an electric cable, infrared rays or radio waves.

It is possible to allow for the various hydraulic motors to receive the fluid from a single pressure pump connected to all the motors by means of two or more valves; the pressure differentiation, and therefore the motion differentiation, is consequently determined by the closing or the partial or total opening of the valves. The fluid pressure pump may be included in the trolley; preferably it may be separate, for example transported on an auxiliary trolley moved by the operator. This solution offered by the new transport trolley allows each set of wheels, right and left, to be moved independently of the other, that is, by moving the two sets of wheels in a differentiated manner, it is possible to obtain forward and reverse motion and turning of the new transport trolley on the floor without any effort by the operator. The power may be supplied to the control unit by the mains or by batteries.

BRIEF DESCRIPTION OF THE DRAWINGS

The following is just an example among many of a practical embodiment of the invention in question, illustrated in the enclosed drawings, wherein:

FIG. 1 is a top plan view of the transport trolley of the invention;

FIG. 2 is a front perspective view of the transport trolley; and

DESCRIPTION OF THE PREFERRED EMBODIMENT

Figure 3:
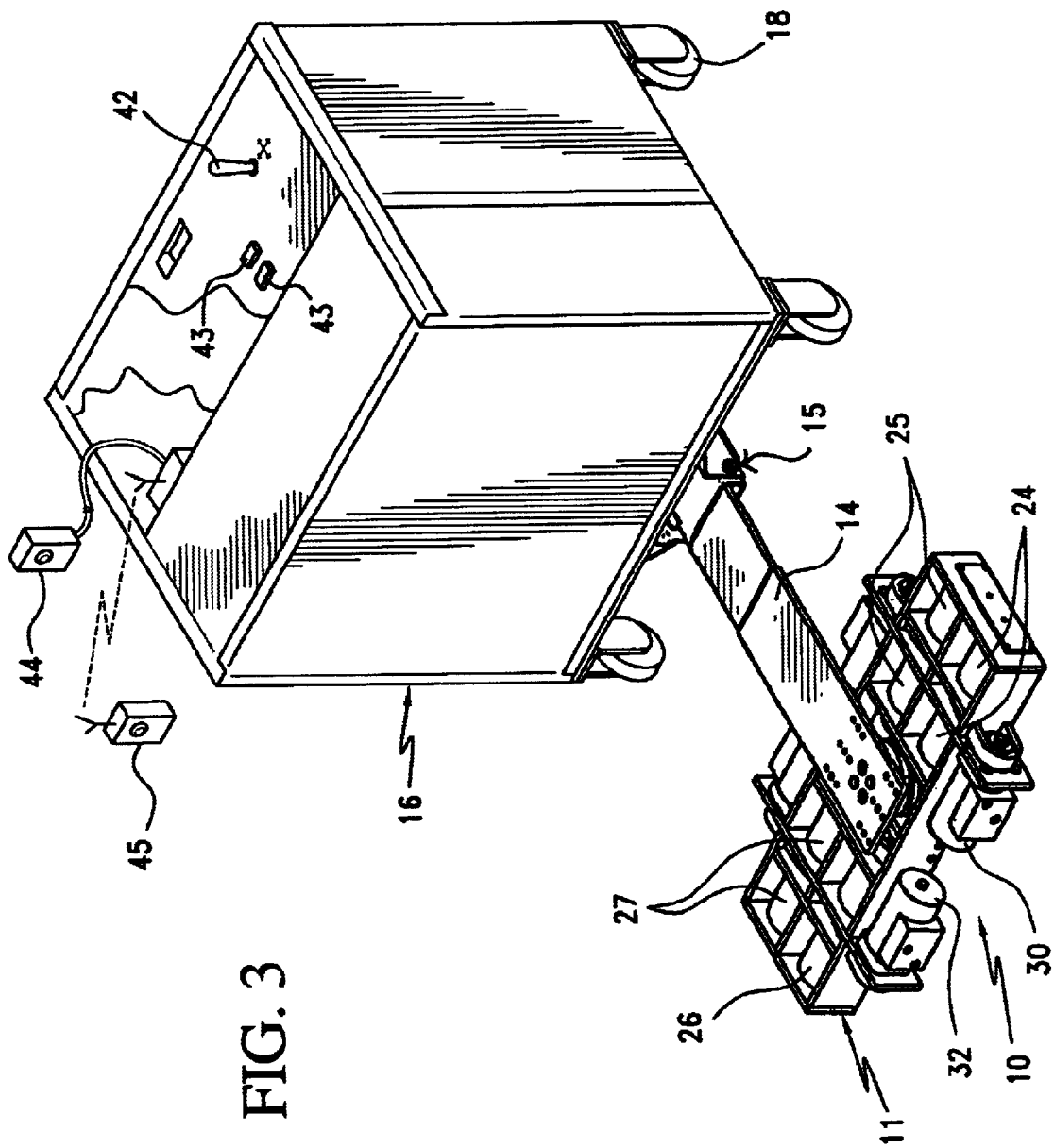
FIG. 3 is a front perspective view of the transport trolley connected to a mobile control unit.

The transport trolley 10 of the invention includes a low profile frame 11 to which an outer end 12 of an extensible bar or tongue 14 is connected. As shown in FIG. 3, the tongue is pivotally connected at 15 about a horizontal axis to a control unit 16 which is carried by a plurality of wheels or rollers 18. The hinged connection of the trolley 10 to the control unit 16 reduces the bulk of the trolley when not in use.

The frame 11 is defined by a plurality of plates 20 which are spaced to provide open housings 21 for a plurality of sets or pairs of rollers or wheels which are of relatively small diameter but broad in width. Each pair of wheels are mounted to the frame and are mounted to be commonly driven by drive connections to separate hydraulic motors.

In the embodiment shown in the drawings, two sets of wheels 24 and 25 are provided to support one side of the frame 11 while two other sets of wheels 26 and 27 are provided to support the opposite side of the frame.

As previously described, it is one of the unique features of the invention that the wheels on opposite sides of the frame may be independently powered such that by controlling rotation and direction of rotation of the wheels, the trolley can be moved forwardly, rearwardly or turned relative to its central vertical axis. The independent drive of the wheels permits a differentiated drive to be established between the various sets of wheels such that the wheels on one side of the frame may be operated in one direction while the wheels on the opposite side are operated in a reverse direction, thereby facilitating turning or rotational movement of the trolley without having to steer or the turn the wheels. A rotatable upper horizontal load supporting platform 28 is shown in dotted line in FIG. 1 as being mounted to the frame.

To provide drive power to the sets of wheels, a plurality of hydraulic motors are mounted to the frame 11 of the trolley. In the embodiment shown, the sets of wheels are driven by a hydraulic motors 30, 31, 32 and 33. The motors include suitable connections 40 for connecting to a pressure pump (not shown). Each motor is connected by cogged belts, chains or gears to the respective wheels.

The hydraulic motors are each connected by way of appropriate hydraulic lines to the control unit 16 so as to be responsive to and controlled by the control unit in response to an input, such as by way of a handle, lever or joystick 42 associated with the control unit. As opposed to a lever, push buttons 43 may be used. Further, as opposed to mechanical controllers 42 or 43, a tethered handheld controller 44 may be used or a remote infrared or radio wave controller 45 may be used.

What is claimed is:

1. A motor-driven transport trolley comprising; a low profile frame having opposite left and right side portions, front and rear ends and a central portion defined intermediate said front and rear ends and between said opposite left and right side portions, a tongue mounted to said central portion and extending therefrom horizontally outwardly beyond said rear end of said frame to a connection with a control unit, a first plurality of wheels for supporting said low profile frame, at least two first sets of said first plurality of wheels mounted to said left side portion and at least two second sets of said first plurality of wheels mounted to said right side portion in such a manner that said first plurality of wheels do not extend above an upper portion of said low profile frame, a plurality of hydraulic motors mounted to said low profile frame so as not to extend above said upper portion of said low profile frame, said plurality of hydraulic motors being drivingly connected to said first and second sets of wheels such that each of said first and second sets of wheels is independently driven with respect to one another, a platform rotatably mounted relative to said upper portion of said low profile frame, said control unit including means for controlling said plurality of hydraulic motors and a second plurality of wheels for supporting said control unit, whereby said low profile frame may be moved forwardly, rearwardly or rotated relative to a central vertical axis thereof by operation of said first and second sets of wheels by said plurality of hydraulic motors.

2. The motor-driven transport trolley of claim 1 in which each set of wheels includes two wheels.

3. The motor-driven transport trolley of claim 1 wherein said control unit includes an input element selected from a group of elements consisting of levers, a joystick, push-buttons, a tethered cable, infrared controller and radio wave controller.

4. The motor-driven transport trolley of claim 1 in which each of said first plurality of wheels are cylindrical in configuration having diameters which are smaller than a width of said first plurality of wheels.

* * * * *